(12) United States Patent
Henry

(10) Patent No.: US 11,448,873 B2
(45) Date of Patent: Sep. 20, 2022

(54) SYSTEM AND METHOD FOR CLEANING VISION SENSORS OF AN AGRICULTURAL MACHINE

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 547 days.

(21) Appl. No.: 16/578,906

(22) Filed: Sep. 23, 2019

(65) Prior Publication Data

US 2021/0088780 A1 Mar. 25, 2021

(51) Int. Cl.
| | |
|---|---|
| *G02B 27/00* | (2006.01) |
| *B06B 3/00* | (2006.01) |
| *G06V 10/75* | (2022.01) |
| *G06V 20/30* | (2022.01) |
| *G06V 20/56* | (2022.01) |

(52) U.S. Cl.
CPC ............ *G02B 27/0006* (2013.01); *B06B 3/00* (2013.01); *G06V 10/751* (2022.01); *G06V 20/30* (2022.01); *G06V 20/56* (2022.01)

(58) Field of Classification Search
CPC .... G02B 27/0006; B06B 3/00; G06V 10/751; G06V 20/30; G06V 20/56
USPC .......................................................... 701/36
See application file for complete search history.

(56) References Cited

U.S. PATENT DOCUMENTS

| | | | |
|---|---|---|---|
| 4,387,973 A | 6/1983 | Martin | |
| 7,215,375 B2 | 5/2007 | Chen et al. | |
| 8,009,979 B2 | 8/2011 | Shirono | |
| 8,899,761 B2 | 12/2014 | Tonar et al. | |
| 9,083,864 B2 | 7/2015 | Reed | |
| 9,252,685 B2 | 2/2016 | Ifuku et al. | |
| 9,436,005 B2 | 9/2016 | Koops et al. | |
| 9,925,570 B2 | 3/2018 | Ji et al. | |
| 10,156,719 B2 | 12/2018 | Fujimoto et al. | |
| 11,281,982 B2 * | 3/2022 | Cristache | G06F 40/216 |
| 2018/0154406 A1 | 6/2018 | Magee et al. | |

(Continued)

FOREIGN PATENT DOCUMENTS

| | | |
|---|---|---|
| CA | 2179021 A1 | 4/1996 |
| CN | 102143308 A | 8/2011 |

(Continued)

OTHER PUBLICATIONS

"Canon EOS—Integrated Cleaning System," YouTube, Dated May 21, 2009 (3 pages) https://www.youtube.com/watch?v=x939m5bGhFM.

(Continued)

*Primary Examiner* — James D Sells

(74) *Attorney, Agent, or Firm* — Rebecca L. Henkel; Rickard K. DeMille

(57) ABSTRACT

A system for removing debris from a vision-based sensor of an agricultural machine includes an agricultural machine and a vision-based sensor supported on the agricultural machine. The vision-based sensor is configured to generate vision data. The system further includes a vibration source configured to be a separate component frons the vision-based sensor. The vibration source is supported on the agricultural machine. Moreover, the vibration source is configured to oscillate the vision-based sensor to remove debris from the vision-based sensor.

20 Claims, 6 Drawing Sheets

(56) References Cited

U.S. PATENT DOCUMENTS

2018/0210194 A1    7/2018  Nishiyama et al.
2018/0329206 A1   11/2018  Cohen et al.
2019/0084526 A1    3/2019  Seubert et al.
2019/0106085 A1    4/2019  Bacchus et al.

FOREIGN PATENT DOCUMENTS

FR            2841488 A1    1/1920
WO    WO 2018019459         2/2018

OTHER PUBLICATIONS

"How Does the Self-Cleaning Function in DSLRs Work?" Quora, Dated Dec. 22, 2014 (2 pages) https://www.quora.com/How-does-the-self-cleaning-function-in-DSLRs-work.
International Search Report and Written Opinion Corresponding to Application No. PCT/IB2020/058805 dated Dec. 31, 2020 (8 pages).

* cited by examiner

SYSTEM AND METHOD FOR CLEANING VISION SENSORS OF AN AGRICULTURAL MACHINE

FIELD

The present disclosure generally relates to agricultural machines and, more particularly, to systems and methods for cleaning sensors, such as vision-based sensors, on an agricultural machine.

BACKGROUND

Agricultural implements, such as cultivators, disc harrows, seeders, and/or the like, perform one or more agricultural operations while being towed across a field by a suitable work vehicle, such as in agricultural tractor. In this regard, agricultural implements often include one or more sensors mounted thereon to monitor various parameters associated with the performance of such agricultural operations. For example, some agricultural implements include one or more cameras or other vision-based sensors that capture images of the soil and/or plants within the field. Thereafter, such images may be processed or analyzed to determine one or more parameters associated with the condition of soil and/or plants, such as parameters related to soil roughness, plant health, weed growth, residue parameters, clod size and/or the like.

During the performance of many agricultural operations, the implement typically generates large amounts of dust and other airborne particulate matter. In this regard, dust may adhere to the lens(es) of the cameras) mounted on the implement in such a manner that one or more pixels of the cameras(s) are obscured or otherwise blocked from receiving light. Furthermore, large amounts of dust present within the field(s) of view of the cameras) may also obscure various pixels of the camera(s). Image data captured by cameras having obscured pixels may have low quality, thereby resulting in poor camera performance.

Accordingly, an improved system and method for cleaning vision-based sensors of an agricultural machine would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for removing debris from a vision-based sensor of an agricultural machine. The system includes an agricultural machine and a vision-based sensor supported on the agricultural machine. The vision-based sensor is configured to generate vision data. The system further includes a vibration source configured as a separate component from the vision-based sensor. The vibration source is supported on the agricultural machine. Moreover, the vibration source is configured to oscillate the vision-based sensor to remove debris from the vision-based sensor.

In another aspect, the present subject matter is directed to a method for removing debris from a vision-based sensor of an agricultural machine. The method includes receiving, with a computing device, vision data from a vision-based sensor supported on an agricultural machine as the agricultural machine is being moved across a field. Additionally, the method includes initiating, with the computing device, a cleaning procedure by activating a vibration source configured as a separate component from the vision-based sensor. The vibration source is activated when it is determined the vision-based sensor may be at least one of obscured or inoperative or at predetermined intervals of time. Moreover, the vibration source is configured to oscillate the vision-based sensor to remove debris from the vision-based sensor.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
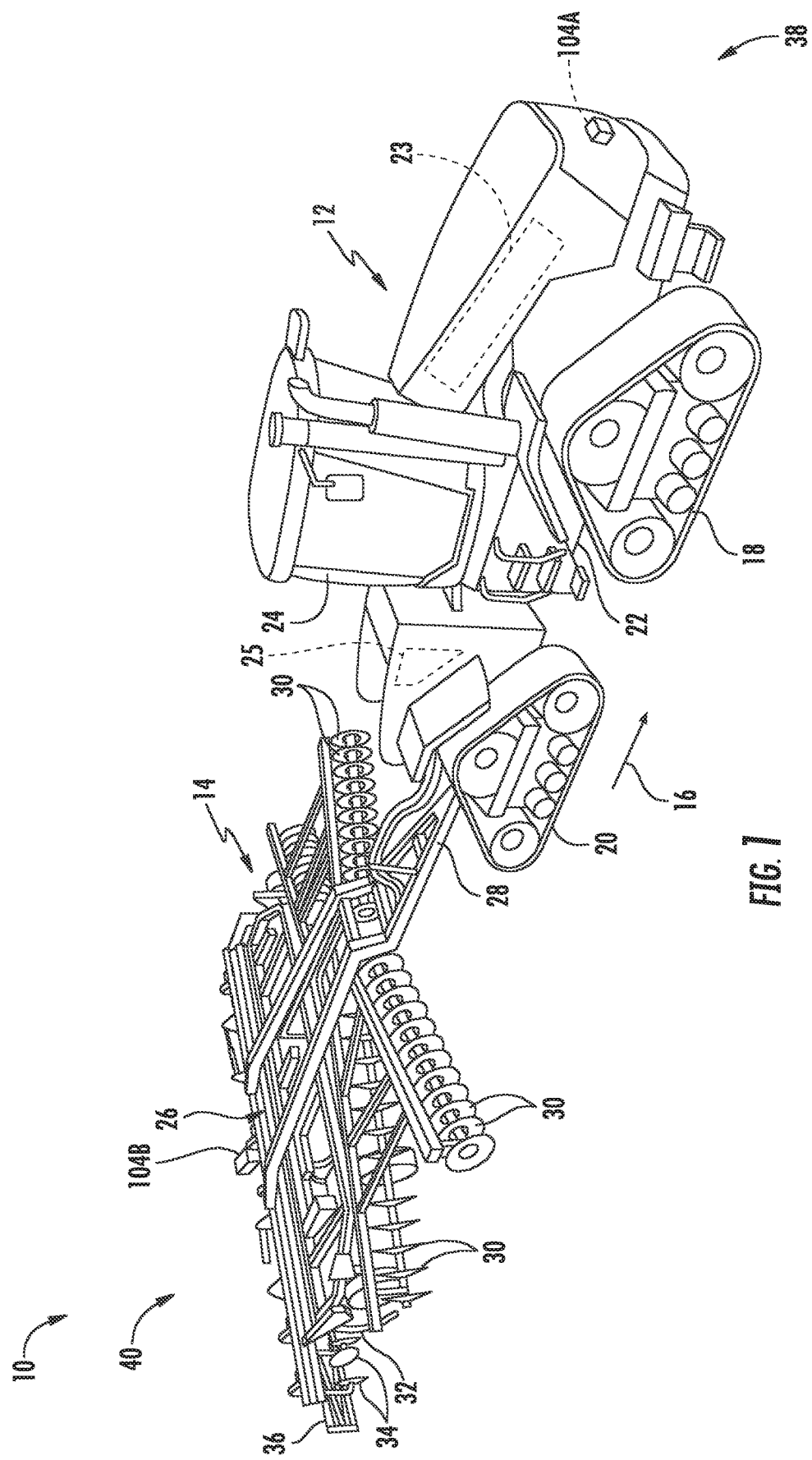
FIG. 1 illustrates a perspective view of one embodiment of an agricultural machine in accordance with aspects of the present subject matter, particularly illustrating the agricultural machine including a work vehicle and associated implement.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as pail of one embodiment can be used with another embodiment to yield a still further embodiment. Thus, it is intended that the present invention covers such modifications and variations as come within the scope of the appended claims and their equivalents.

In general, the present subject matter is directed to systems and methods for removing debris from a vision based-sensor of an agricultural machine. For example, the vision-based sensor may be supported on the agricultural machine and configured to generate vision data (e.g., plurality of images). The system further includes a vibration source as a separate component from the vision-based sensor and also mounted on the agricultural machine. In one embodiment, the vision-based sensor may be mounted directly to an oscillator such that the oscillator vibrates the vision-based sensor to remove debris from the vision-based sensor. In another embodiment, an ultrasonic transmitter may be mounted on the agricultural machine at a different, spaced-apart location from the vision-based sensor. In such embodiment, the ultrasonic transmitter may be oriented to transmit ultrasonic waves toward the vision-based sensor to remove debris from the vision-based sensor.

Additionally, in one embodiment, a controller of the system may generally be configured to activate or otherwise control the operation of the vibration source. For instance, an operator may notice that images captured by the vision-based sensor are obscured and initiate a cleaning procedure, and, in response, the controller may activate the vibration source. As another example, the controller may automatically initiate the cleaning procedure by activing the vibration source at predetermined intervals of time. As a still further example, as explained below, the controller may automatically determine that the vision-based sensor is obscured based on vision data received from the vision-based sensor and initiate the cleaning procedure.

Referring now to drawings, FIG. 1 illustrates a perspective view of one embodiment of an agricultural machine 10 in accordance with aspects of the present subject matter. In the illustrated embodiment, the agricultural machine 10 includes a work vehicle 12 and an associated agricultural implement 14. In general, the work vehicle 12 is configured to tow the implement 14 across a field in a direction of travel (e.g., as indicated by arrow 16 in FIG. 1). As shown, the work vehicle 12 may be configured as an agricultural tractor and the implement 14 may be configured as an associated tillage implement. However, in other embodiments, the work vehicle 12 may be configured as any other suitable type of vehicle, such as an agricultural harvester, a self-propelled sprayer, and/or the like. Similarly, the implement 14 may be configured as any other suitable type of implement, such as a planter. Furthermore, it should be appreciated that the agricultural machine 10 may correspond to any suitable powered and/or unpowered agricultural machine (including suitable vehicles and/or equipment, such as only a work vehicle or only an implement). Additionally, the agricultural machine 10 may include more than two associated vehicles, implements, and/or the like (e.g., a tractor, a planter, and an associated air cart).

As shown in FIG. 1, the work vehicle 12 includes a pair of front track assemblies 18, a pair or rear track assemblies 20, and a frame or chassis 22 coupled to and supported by the track assemblies 18, 20. An operator's cab 24 may be supported by a portion of the chassis 22 and may house various input devices (e.g., a user interface 102 shown in FIG. 3) for permitting an operator to control the operation of one or more components of the work vehicle 12 and/or one or more components of the implement 14. Additionally, as is generally understood, the work vehicle 12 may include an engine 23 and a transmission 25 mounted on the chassis 22. The transmission 25 may be operably coupled to the engine 23 and may provide variably adjusted gear ratios for transferring engine power to the track assemblies 18, 20 via a drive axle assembly (not shown) (or via axles if multiple drive axles are employed).

Additionally, as shown in FIG. 1, the implement 14 may generally include a carriage frame assembly 26 configured to be towed by the work vehicle 12 via a pull hitch or tow bar 28 in the direction of travel 16 of the vehicle 12. As is generally understood, the carriage frame assembly 26 may be configured to support a plurality, of ground-engaging tools, such as a plurality of shanks, disk blades, leveling blades, basket assemblies, tines, spikes, and/or the like. For example, in the illustrated embodiment, the carriage frame assembly 26 is configured to support various gangs of disc blades 30, a plurality of ground engaging shanks 32, a plurality of leveling blades 34, and a plurality of crumbler wheels or basket assemblies 36. However, in alternative embodiments, the carriage frame assembly 26 may be configured to support any other suitable ground engaging tools and/or combination of ground engaging tools. In several embodiments, the various ground-engaging tools may be configured to perform a tillage operation or any other suitable ground-engaging operation across the field along which the implement 14 is being towed. It should be understood that, in addition to being towed by the work vehicle 12, the implement 14 may also be a semi-mounted implement connected to the work vehicle 12 via a two point hitch (not shown) or the implement 14 may be a fully mounted implement (e.g., mounted the work vehicle's 12 three point hitch (not shown)).

Furthermore, in accordance with aspects of the present subject matter, the agricultural machine 10 may include one or more vision-based sensors 104 coupled thereto and/or supported thereon. As will be described below, each vision-based sensor 104 may be configured to capture image data and and/or other vision-based data from the field (e.g., of the soil present within the field) across which the implement 14 is moved. Specifically, in several embodiments, the vision-based sensor(s) 104 may be provided in operative association with the work vehicle 12 and/or the implement 14 such that the vision-based sensor(s) 104 has a field of view or sensor detection range directed towards a portion(s) of the field adjacent to the work vehicle 12 and or the implement 14. For example, as shown in FIG. 1, in one embodiment, one vision-based sensor 104A may be provided at a forward end 38 of the work vehicle 12 to allow the vision-based sensor 104A to capture image data of a section of the field disposed in front of the work vehicle 12. Similarly, as shown in FIG. 1, a second vision-based sensor 104B may be provided at or adjacent to an aft end 40 of the implement 14 to allow the vision-based sensor 104B to capture image data of a section of the field disposed behind the implement 14. It should be appreciated that, in alternative embodiments, the vision-based sensors 104A, 104B may be installed at any other suitable location(s) on the work vehicle 12 and/or the implement 14, such as to the carriage frame assembly 26. Furthermore, it should be appreciated that the agricultural machine 10 may include only one vision-based sensor assembly 104 mounted on either the work vehicle 12 or the implement 14 or more than two vision-based sensor assemblies 104 mounted on one or both of the work vehicle 12 or the implement 14.

Moreover, it should be appreciated that the vision-based sensor(s) 104 may correspond to any optical sensor or suitable sensing device(s) configured to detect or capture image data or other vision-based data (e.g., point cloud data) associated with the soil present within an associated field of view. For example, in several embodiments, the vision-based sensor(s) 104 may correspond to an optical sensor(s) or suitable camera(s) configured to capture images of the field, such as three-dimensional images of the soil surface or the plants present with in the associated field of view. For instance, in a particular embodiment, the vision-based sensor(s) 104 may correspond to a stereographic camera(s) having two or more lenses with a separate image sensor for each lens to allow the camera(s) to capture stereographic or three-dimensional images. However, in alternative embodiments, the vision-based sensor(s) 104 may correspond to Light Detection and Ranging (LIDAR) sensor(s) or any other suitable vision-based sensing device(s).

Additionally, it should be further appreciated that the configuration of the agricultural machine 10 described above and shown in FIG. 1 are provided only to place the present subject matter in an exemplary field of use. Thus, it should be appreciated that the present subject matter may be readily adaptable to any manner of machine configuration.

Figure 2:
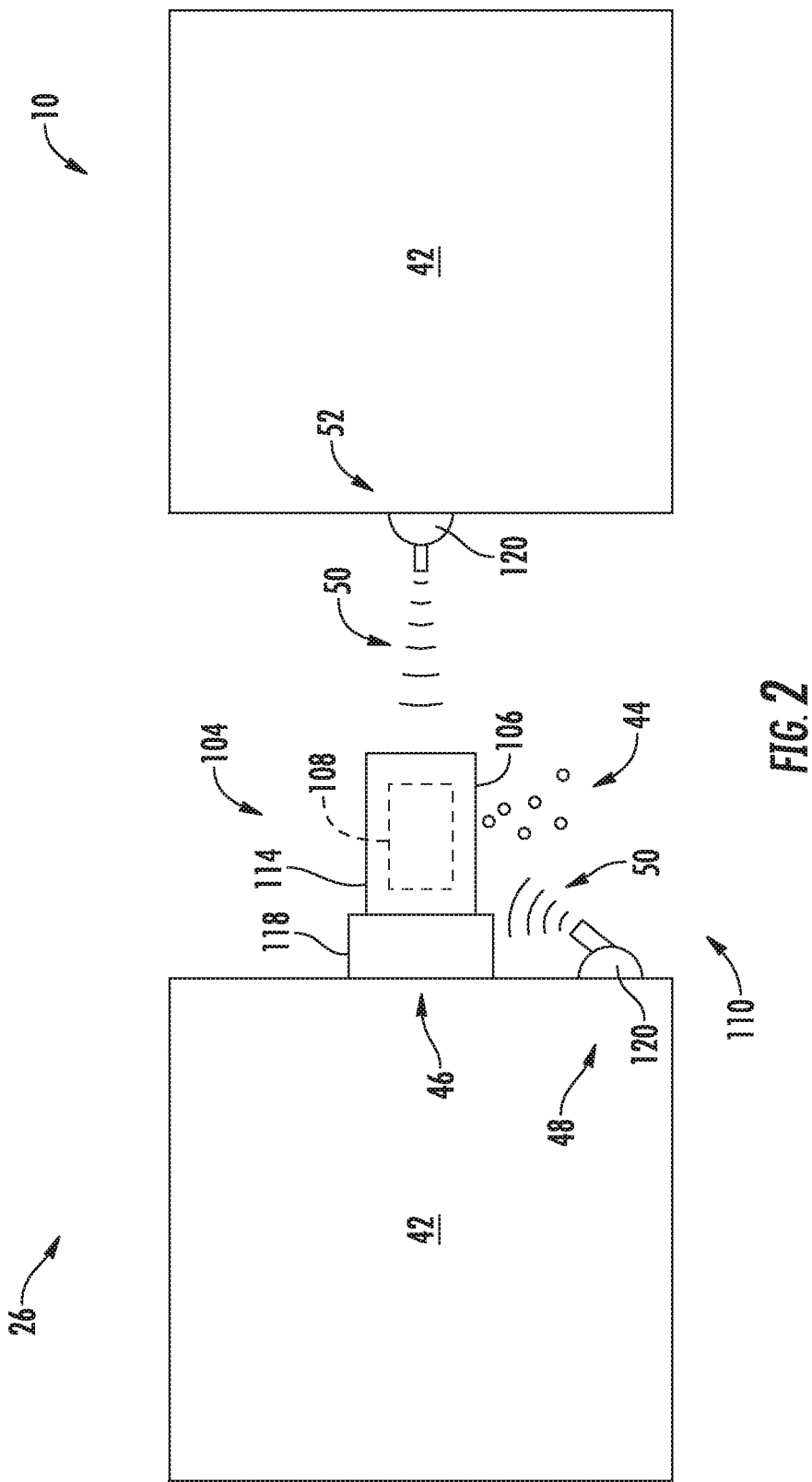
FIG. 2 illustrates a schematic view of one embodiment of a vision-based sensor for use with the agricultural machine shown in FIG. 1 in accordance with aspects of the present subject matter, particularly illustrating a cleaning system of the sensor.

Referring now to FIG. 2, a schematic view of one embodiment of a vision-based sensor 104 and an associated cleaning system 110 suitable for use within an agricultural machine (e.g., the machine 10 described above with reference to FIG. 1) is illustrated in accordance to aspects of the present subject matter. In the illustrated embodiment, the vision-based sensor 104 is shown as being mounted to a portion of the frame assembly 26 of the implement 14 described above with reference to FIG. such as to a frame member 42 of the frame assembly 26. However, in additional or alternative embodiments, it should be appreciated that the vision-based sensor 104 may be mounted at any suitable location on or relative to an agricultural machine 10, such as on or relative to the implement 14, the work vehicle 12, or any suitable components or structure attached thereto.

The vision-based sensor 104 may generally be configured to capture vision data, such as a plurality of images, as the agricultural machine 10 is moved across the field. However, during the performance of an agricultural operation, the vision-based sensor 104 may become coated with debris 44 (e.g., particulate matter, dust, mud, crop residue, droplets, or the like), thereby preventing the vision-based sensor 104 from capturing vision data and/or reducing the quality of such data. As such, the disclosed cleaning system 110 may be provided to remove at least a portion of such debris 44 from the vision-based sensor 104, For instance, the cleaning system 110 may include one or more vibration sources, such as oscillators 118 and/or ultrasonic transmitters 120, as a separate component(s) from the vision-based sensor 104 and configured to vibrate and/or oscillate the vision-based sensor 104 and thereby break the bond between the debris 44 and the vision-based sensor 104, allowing at least a portion of the debris 44 accumulated on the vision-based sensor 104 to break free and fall off.

As shown, in the illustrated embodiment, the vision-based sensor 104 corresponds to a camera mounted to the agricultural machine 10 at a first position 46. In this regard, the vision-based sensor 104 may include one or more lenses 106, with each lens 106 being configured to direct light from the field of view of the vision-based sensor 104 onto an associated image sensor 108, such as a charge coupled device (CCD) image sensor or a complementary metal-oxide semiconductor (CMOS) image sensor. For example, in embodiments in which the vision-based sensor 104 is a stereographic camera, the vision-based sensor 104 may include two lenses 106 and two associated image sensors 108. The image sensor(s) 108 may, in turn, convert the received light into a captured image having a plurality of pixels contained therein. However, it should be appreciated that, in alternative embodiments, the vision-based sensor 104 may have any other suitable configuration.

Furthermore, in one embodiment, the cleaning system 110 may be configured to vibrate the vision-based sensor 104 at an ultrasonic frequency. Ultrasonic frequencies are generally higher than the upper audible limit of human hearing. For example, cleaning system 110 may vibrate the vision-based sensor 104 at a frequency at or above approximately 20 kilohertz. In certain embodiments, the cleaning system 110 may vibrate the vision-based sensor 104 at a frequency up to several gigahertz. In one embodiment, the cleaning system 110 may generally vibrate the vision-based sensor 104 at a frequency between approximately 150 kilohertz and 25 megahertz.

In one embodiment, the cleaning system 110 may include the vibration source mounted at or adjacent to the vision-based sensor 104 on the agricultural machine 10. For instance, the oscillator 118 may be mounted or otherwise coupled to the agricultural machine 10 at the first position 46, For instance, the oscillator 118 may be mounted or otherwise coupled to the agricultural machine 10 and the vision-based sensor 104 may be mounted or otherwise coupled to the oscillator 118. As such, it should be appreciated that the oscillator 118 may be included as a component of the mounting structure associated with the vision-based sensor 104. Generally, the oscillator 118 may receive a signal (e.g., a current) and in response may vibrate or shake a sensor housing 114 of the vision-bases sensor 104. Such vibrations may be transferred to the lens(es) 106 of the vision-based sensor 104 to break free any debris 44 that has adhered to or otherwise coated all or a portion of the lens(es) 106. The oscillator 118 may include one or more electric motors, offset motors, or acoustic vibration sources. However, in other embodiments, it should be appreciated that the oscillator 118 may be configured as any other component or combination of components suitable for vibrating the vision-based sensor 104 such that debris 44 is removed from the sensor 104.

In an additional or alternative embodiment, the vibration source may be mounted at a separate location spaced from the vision-based sensor 104. For example, as shown in the embodiment of FIG. 2, the ultrasonic transmitter 120 may be mounted or otherwise coupled to the agricultural machine 10 at a second position 48 along the same component of the agricultural machine 10. (e.g., the same frame member 42 in the embodiment of FIG. 2). The second position 48 is illustrated as below the first position 46 in the embodiment of FIG. 2. However, in other embodiments, it should be appreciated that the second position 48 may be beside or above the first position 46. In another embodiment, the ultrasonic transmitter may be mounted or otherwise coupled to another component of the agricultural machine 10 different than the component to which the vision-based sensor 104 is mounted. For instance, as shown, the ultrasonic transmitter 120 may be mounted or otherwise coupled to the agricultural machine 10 at a third position 52 relative to the vision-based sensor 104. In one embodiment, as shown, the first and third positions 46, 52 may be on separate frame members 42 of the frame assembly 26. It should be appreciated that the ultrasonic transmitter 120 may generally correspond to a device that converts electric signals and/or energy into ultrasound waves. For example, the ultrasonic transmitter 120 may receive a signal (e.g., a current) and in response to such signal emit ultrasonic waves 50. In one embodiment, ultrasonic transmitter 120 may include a piezoelectric transducer that oscillates when a voltage is applied to the piezoelectric transducer. In another embodiment, the ultrasonic transmitter 120 may include capacitive transducers that use electrostatic fields between a conductive diaphragm and a backing plate. Still, in other embodiments, the ultrasonic transmitter 120 may include any combination of components capable of producing the ultrasonic waves 50.

Furthermore, as shown, the ultrasonic transmitter 120 may be oriented to direct the ultrasonic waves 50 towards the first position 46, and, thus, towards the vision-based sensor 104. In one instance, the ultrasonic transmitter 120 may be positioned and oriented such that the ultrasonic waves 120 are directed directly towards the lens(es) 106 of the vision-based senor 104. For instance, as shown, the ultrasonic transmitter 120 at the second position 46 may be configured to direct the ultrasonic waves 50 directly towards the lens 106 to vibrate the lens 106 to remove any debris 44 from the lens 106. In another instance, the ultrasonic transmitter 120 may be positioned and oriented such that the ultrasonic waves 120 are directed towards the sensor housing 114 of the vision-based sensor 104. For instance, as shown, the ultrasonic transmitter 120 at the third position 52 may be configured to direct the ultrasonic waves 50 towards the sensor housing 114 to vibrate or shake the sensor housing 114, and such vibrations may be transferred to the lens 106 of the vision-based sensor 104 to break free any debris 44 that has adhered to the lens 106.

Figure 3:
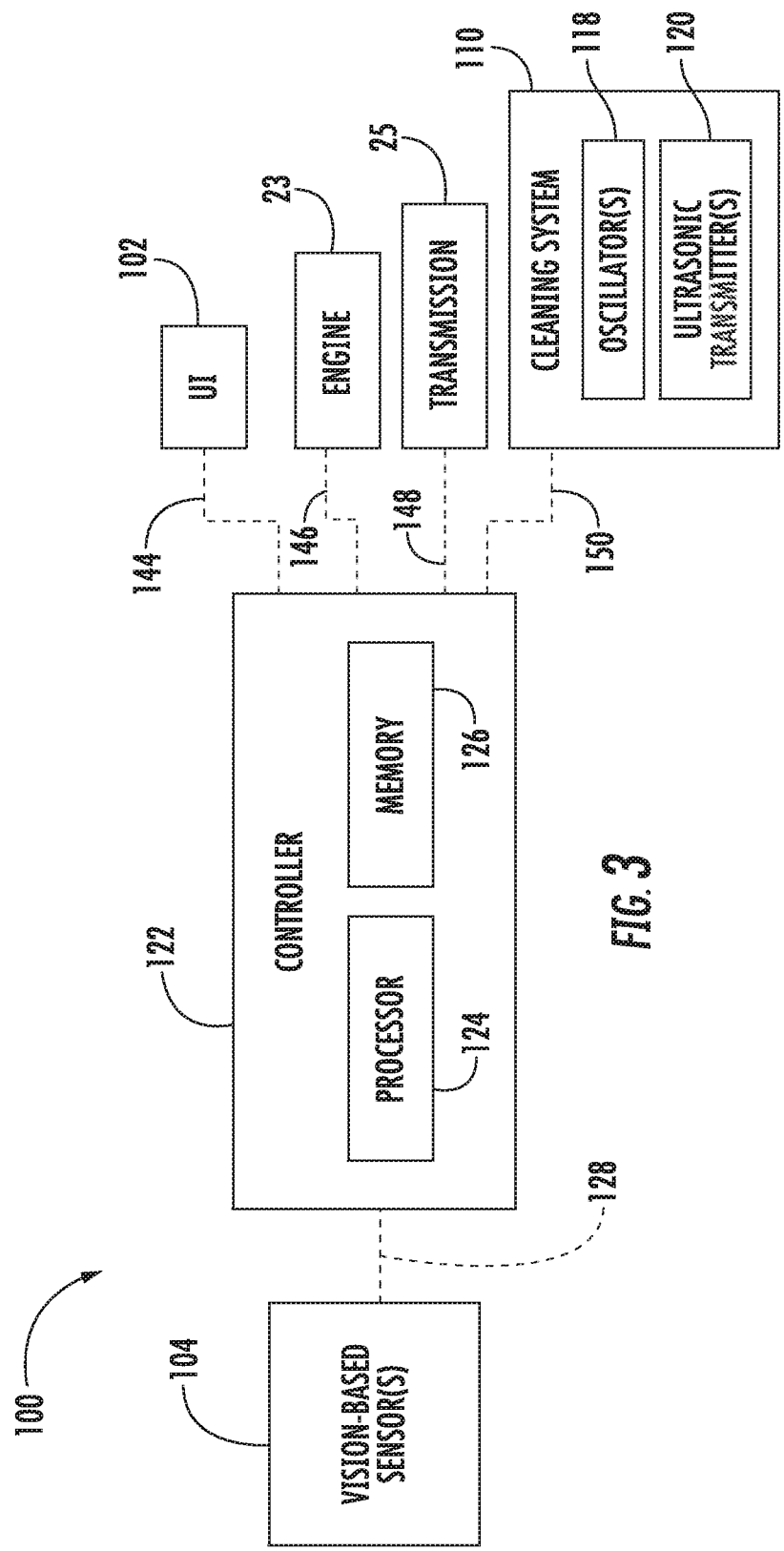
FIG. 3 illustrates a schematic view of one embodiment of a system for removing debris from a vision-based sensor of an agricultural machine in accordance with aspects of the present subject matter.

Referring now to FIG. 3, a schematic view of one embodiment of a system 100 for removing debris from a vision-based sensor of an agricultural machine is illustrated in accordance with aspects of the present subject matter. In general, the system 100 will be described herein with reference to the agricultural machine 10 described above with reference to FIG. 1 and the vision-based sensor 104 and cleaning system 110 described in reference to FIG. 2. However, it should be appreciated by those of ordinary skill in the art that the disclosed system 100 may generally be utilized with agricultural machines, vision-based sensors, and vibration sources having any other suitable configuration.

As shown in FIG. 3, the system 100 may include one or more components of the agricultural machine 10 described above with reference to FIGS. 1 and 2. For example, in several embodiments, the system 100 may include one or more of the vision-based sensors 104 and any suitable components of the disclosed cleaning system 110, such as the vibration source(s) 118, 120. However, it should be appreciated that the system 100 may include any other suitable components of the agricultural machine 10, such as one or more other components of the work vehicle 12 and/or the implement 14.

Moreover, the system 100 may further include a controller 122 configured to electronically control the operation of one or more components of the agricultural machine 10, such as one or more components of the work vehicle 12 and or the implement 14. In general, the controller 122 may comprise any suitable processor-based device known in the art, such as a computing device or any suitable combination of computing devices. Thus, in several embodiments, the controller 122 may include one or more processor(s) 124 and associated memory device(s) 126 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 126 of the controller 122 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 126 may generally be configured to store suitable computer-readable instructions that, when implemented by the processor(s) 124, configure the controller 122 to perform various computer-implemented functions, such as one or more aspects of the method 200 described below with reference to FIG. 6. In addition, the controller 122 may also include various other suitable components, such as a communications circuit or module, one or more input/output channels, a data/control bus and/or the like.

It should be appreciated that the controller 122 may correspond to an existing controller of the work vehicle 12 or the implement 14 or the controller 122 may correspond to a separate processing device. For instance, in one embodiment, the controller 122 may form all or part of a separate plug-in module that may be installed within the work vehicle 12 or implement 14 to allow for the disclosed system and method to be implemented without requiring additional software to be uploaded onto existing control devices of the work vehicle 12 or implement 14.

Furthermore, in one embodiment, the system 100 may also include a user interface 102. Specifically, the user interface 102 may be communicatively coupled to the controller 122 via a wired or wireless connection to allow feedback signals (e.g., as indicated by dashed line 144 in FIG. 3) to be transmitted from the controller 122 to the user interface 102. As such, the user interface 102 may be configured to provide feedback to the operator of the implement 14 based on the feedback signals 144. The user interface 102 may include one or more feedback devices (not shown), such as display screens, speakers, warning lights, and/or the like, which are configured to communicate such feedback. In addition, some embodiments of the user interface 102 may include one or more input devices (not shown), such as touchscreens, keypads, touchpads, knobs, buttons, sliders, switches, mice, microphones, and/or the like, which are configured to receive user inputs from the operator. In one embodiment, the user interface 102 may be positioned within the operator's cab 24 of the work vehicle 12. However, in alternative embodiments, the user interface 102 may have any suitable configuration and/or be positioned in any other suitable location.

In several embodiments, the controller 122 may be configured to assess the agricultural operation being performed based on a plurality of images received from the vision-based sensor(s) 104. Specifically, the controller 122 may be communicatively coupled to the vision-based sensor(s) 104, via a wired or wireless connection to allow image data (e.g., as indicated by dashed line 128 in FIG. 3) to be transmitted from the sensor(s) 104 to the controller 122. The controller 122 may be configured to receive the plurality of images captured by the vision-based sensor(s) 104 as the agricultural machine 10 is moved across the field. Furthermore, the controller 122 may be configured to monitor the images and determine one or more parameters indicative of a condition of the field. For example, the controller 122 may be configured to process or analyze the images and determine a parameter(s) indicative of one or more of soil roughness, plant health, weed growth, residue parameters, clod size, and/or the like. Additionally, the controller 122 may be configured to display such a parameter(s) to the operator of the agricultural machine 10, such as via one or more of the feedback devices of the user interface 102. Furthermore, the controller 122 may be configured to display the plurality of images received from the vision-based sensor(s) 104 utilizing one or more display screens of the user interface 102. For example, the images may be displayed to the operator in the form of a video.

In certain situations, an operator monitoring the images displayed by the controller 122 may determine that the vision-based sensor(s) 104 is obscured with debris 44 (FIG. 2). For instance, the video displayed on the user interface 102 may be of low quality, blurry, partially blocked, or fully blocked. As such, when the operator determines the vision-based sensor(s) 104 is obscured or inoperative, he/she may initiate a cleaning operation of the respective vision-based sensor(s) 104. In one embodiment, the operator may initiate the cleaning procedure utilizing one or more of the input devices (toggles, switches, levers, etc.) of the user interface 102. Specifically, the controller 122 may receive the feedback signal 144 from the user interface 102 and initiate the cleaning procedure.

As shown in the illustrated embodiment, the controller 122 may be communicatively coupled to one or more components of the the cleaning system(s) 110 (e.g., the vibration source(s), such as an oscillator(s) 118 and/or ultrasonic transmitter(s) 120) provided for cleaning the vision-based sensor(s) 104 via a wired or wireless connection to allow control signals (e.g., as indicated by dashed lines 150 in FIG. 3) to be transmitted from the controller 122 to the vibration source(s) of the cleaning system 110. Such control signals 150 may be configured to active the vibration source(s) associated with the vision-based sensor(s) 104 identified as being obscured or inoperative to remove residue 44 from the vision-based sensor(s) 104. For example, the controller 122 may be configured to power the vibration source(s) (e.g., one or more oscillators 118 or ultrasonic transmitters 120) by providing a current to the vibrations source(s). As described above with reference to FIG. 2, the vibration source(s) may be configured to vibrate and shake the vision-based sensor(s) 104 to remove the debris 44 accumulated on the vision-based sensor(s) 104, such as the lens(es) 106 of the sensor(s) 104. In one embodiment, the controller 122 may be configured to activate the vibration source(s) for a predetermined length of time, such as approximately 10 seconds.

In an additional or alternative embodiment, the controller 122 may be configured to determine the vision-based sensor(s) 104 may be obscured and/or inoperative and initiate the cleaning procedure. Additionally or alternatively, the controller 122 may be configured to activate the vibration source(s) at predetermined intervals of time for the predetermined length of time. Specifically, the predetermined interval may be stored within the memory 126 based on historical data indicative of the interval of time between when a vision-based sensor 104 is likely to become obscured with debris 140 to a degree requiring cleaning. As another example, the controller 122 may include a look-up table, suitable mathematical formula, and/or algorithms stored within its memory 126 that correlates a configuration and/or status of the agricultural machine 10 to a suitable interval of time to keep the vision-based sensor 104 free or substantially free of debris 140. For instance, the controller 122 may determine the suitable interval of time based on a speed of the agricultural machine 10, the configuration of any ground-engaging tools of the agricultural machine, and/or the parameter(s) indicative of the condition of the field, such as soil roughness, plant health, weed growth, residue parameters, clod size, soil moisture content, and/or the like.

As an additional or alternative example, the controller 122 may be configured to automatically determine when vision-based sensor(s) 104 is obscured and/or inoperative based on an analysis of the plurality of images received from the vision-based sensor(s) 104 and subsequently initiate the cleaning procedure. For instance, the controller 122 may monitor the images received from the vision-based sensors) 104 as the agricultural machine 10 is moved across the field and identify the vision-based sensor(s) 104 as obscured and/or inoperative based on the plurality of images. For example, the controller 122 may be configured to process or analyze the images and determine whether the vision-based sensor(s) 104 is obscured or otherwise inoperative due to debris accumulation. In such an embodiment, the controller 122 may be configured to automatically activate the vibration source(s), such as by powering the vibration source(s), when the controller 122 identifies the vision-based sensor(s) 104 as being obscured and/or inoperative. For instance, the controller 122 may activate the vibration source(s) for a predetermined length of time upon making such determination. One exemplary procedure that may be utilized by the controller 122 for determining whether the vision-based sensor(s) 104 is obscured and/or inoperative due to debris accumulation is described below. However, it should be appreciated that other procedures and/or methods may occur to one of ordinary skill in the art for determining if the vision-based sensor(s) 104 is obscured with debris and/or otherwise rendered in operable due to debris accumulation and such procedures/methods are equally applicable to the subject matter described herein.

In one exemplary embodiment, the controller 122 may be configured to receive the plurality of images captured by the vision-based sensors) 104, with each image containing a plurality of pixels. Thereafter, the controller 122 may be configured to process or analyze at least a portion of the pixels contained within each of the received images to determine an associated image parameter value for each analyzed pixel. In one embodiment, the controller 122 may be configured to determine the image parameter value for every pixel contained within each received image. However, in another embodiment, the controller 122 may be configured to determine the image parameter value for only a portion of the pixels contained within each received image, such as for pixels at selected locations within the images (e.g., predetermined or randomly determined locations within the images). Such image parameter values may be indicative of the intensity, the color, and/or any other suitable image parameter of the associated pixel. In this regard, the controller 122 may include any suitable image processing algorithms stored within its memory 126 or may otherwise use any suitable image processing techniques to determine the image parameter values associated with the pixels contained within the received images.

Figure 4:
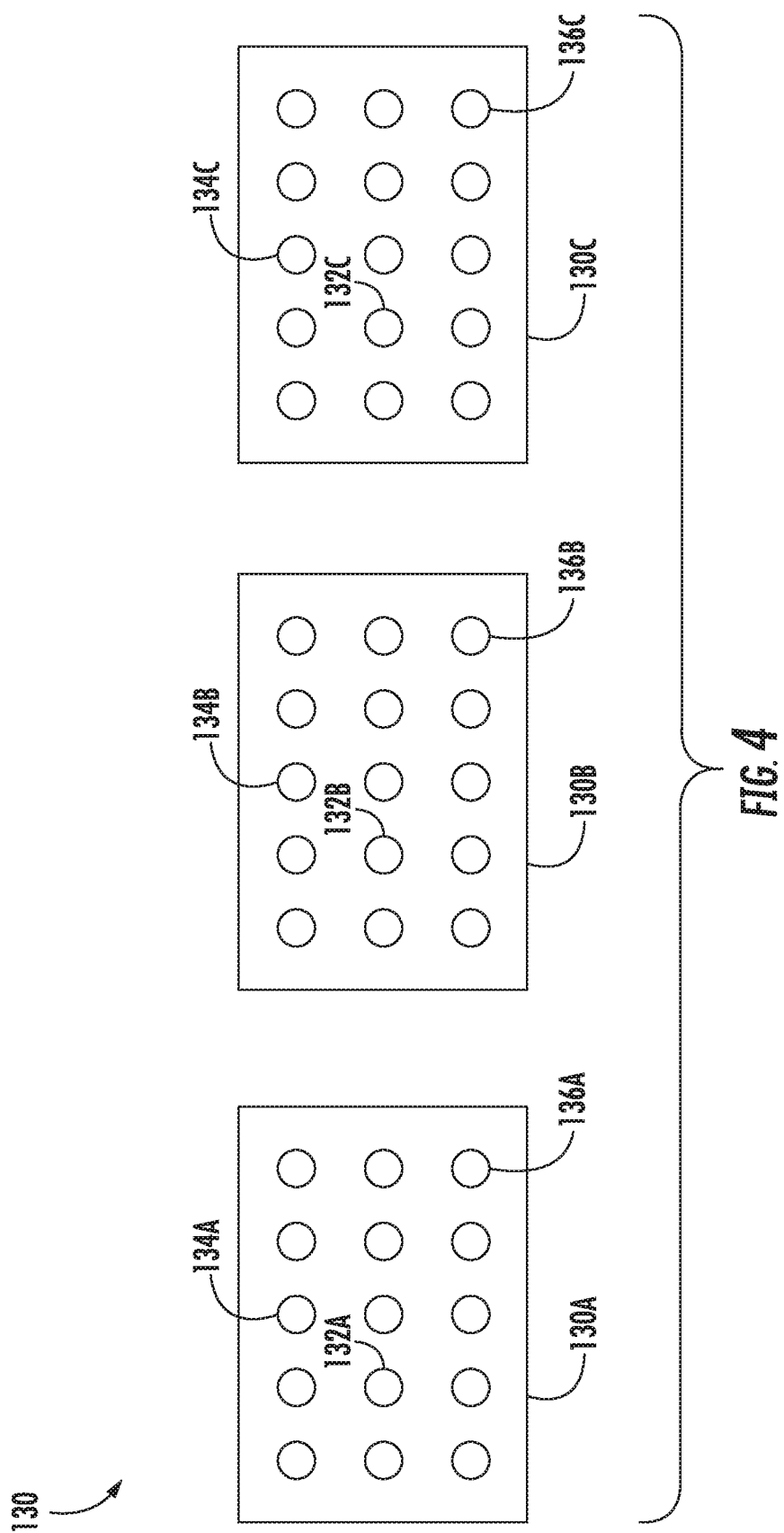
FIG. 4 illustrates an example set of images captured by a vision-based sensor in accordance with aspects of the present subject matter, particularly illustrating a plurality of pixels contained within each of the images.

Referring now to FIG. 4, an example set of a plurality of images 130 received by the controller 122 is illustrated in accordance with aspects of the present subject matter. As shown, the example set of images 130 may include a first image 130A, a second image 130B, and a third image 130C. Furthermore, each of the images 130A-C includes a plurality of pixels, with each pixel being schematically represented h a circle within the corresponding image 130A-C. As indicated above, the controller 122 may be configured to determine an image parameter value associated with at least a portion of the pixels contained within each of the images 130A-C. For example, in one embodiment, the controller 122 may be configured to determine an image parameter value associated with the pixels 132A, 134A, and 136A contained within the first image 130A; the pixels 132B, 1349, and 136B contained within the second image 130B; and the pixels 1320, 134C, and 136C contained within the third image 1300. However, it should be appreciated that, in alternative embodiments, the controller 122 may be configured to determine the image parameter value for any combination of the pixels contained within the images 130A-C. Furthermore, it should be appreciated that each of the pixels 132A-C may correspond to the same respective pixel across each of the images 130A-C. That is, the pixels 132A-C may be captured by the same pixel, photodiode, photodetector, and/or the like of the image sensor 108 (FIG. 2) such that the pixels 132A-C are positioned at the same location within each of the images 130A-C. Similarly, the pixels 134A-C may correspond to the same respective pixel across each of the images 130A-C, and the pixels 136A-C may correspond to the same respective pixel across each of the images 130A-C.

Thereafter, for each respective pixel, the controller 122 may be configured to determine a variance associated with the determined image parameter values (e.g., light intensity) for such respective pixel across the received images. Specifically, in several embodiments, the controller 122 may be configured to calculate the variance in the determined image parameter values for each analyzed pixel across the received images. Such variance may correspond to a differential defined between the image parameter values, the standard deviation of the image parameter values, the range of the image parameter values, and/or any other suitable statistical parameter associated with variance of the image parameter values. Furthermore, in one embodiment, when determining the variance, the controller 122 may be configured to assign weights to the determined image parameter values, such as based on the time when the images were captured by the vision-based sensor(s) 104. In such embodiment, the assigned weights may impact the effect each image parameter value has on the variance calculation. For example, the controller 122 may be configured to assign greater weights to the image parameter values associated with more recently captured images and lower weights to the image parameter values associated with older images. In this regard, the controller 122 may include suitable a mathematical formula(s) stored within its memory 126 for calculating or otherwise determining the variance based on the determined image parameter values.

Referring still to FIG. 4, in the illustrated embodiment, the controller 122 may be configured to determine the variance associated with the image parameter values for the pixels 132, 134, 136. More specifically, the controller 122 may be configured to calculate the variance for the pixel 132 based on the determined image parameter values for the pixel 132A contained within image 130A, the pixel 132B contained within image 130B, and the pixel 132C contained within image 130C. Similarly, the controller 122 may be configured to calculate the variance for the pixel 134 based on the determined image parameter values for the pixel 134A contained within image 130A, the pixel 134B contained within image 130B, and the pixel 134C contained within image 130C. Moreover, the controller 122 may be configured to calculate the variance for the pixel 136 based on the determined image parameter values for the pixel 136A contained within image 130A, the pixel 136B contained within image 130B, and the pixel 136C contained within image 1300. It should be appreciated that the controller 122 may be configured to determine the variance for other pixels contained within the images 130 in a similar manner.

Furthermore, the controller 122 may be configured to identify when a given pixel is obscured or inoperative. Specifically, as the agricultural machine 10 is moved across the field, various objects (e.g., plants, residue, soil, and/or the like) within the field move into and subsequently out of the field(s) of view of the vision-based sensor(s) 104. That is, the images captured by the vision-based sensor(s) 104 may generally change as the agricultural machine 10 is moved across the field. As such, the determined image parameter values (e.g., intensity, color, and/or the like) may vary for each pixel across the received images. In this regard, little or no variance in the determined image parameter values for a given pixel may generally be indicative of the given pixel being obscured or inoperative. For example, dust or another particulate may be present on the lens(es) 106 of the vision-based sensor(s) 104 that obscures one or more of the pixels associated image sensor 108. In general, a pixel may be obscured when a translucent or opaque particulate (e.g., dust, dirt, plant matter, and/or the like) reduces the intensity of the light sensed by that pixel of the image sensor 108, As such, a pixel may be obscured when the particulate partially or entirely blocks the light. Furthermore, an inoperative or "dead" pixel may generally be a pixel on the image sensor 108 that is unable to detect light, such as due to a failure of that pixel. Accordingly, in several embodiments, the controller 122 may be configured to compare the determined variance associated with each analyzed pixel to a predetermined variance range. In the event that the determined variance for a given pixel falls outside of the predetermined variance range, the controller 122 may be configured to identify the given pixel as being obscured or inoperative. It should be appreciated that, in alternative embodiments, the controller 122 may be configured to compare the determined variance associated with each analyzed pixel to only one of a predetermined variance maximum threshold or a predetermined variance minimum threshold.

Additionally, in one embodiment, the controller 122 may be configured to identify a given pixel as being obscured or inoperative based on the intensity value of the given pixel. In certain instances (e.g., during daytime operations), when the image sensor(s) 108 of the vision-based sensor(s) 104 are properly functioning, the pixels contained within the captured images generally have a certain threshold level of intensity. As such, a given pixel may generally be obscured or inoperative when the intensity of the given pixel falls below a certain intensity threshold. In this regard, the controller 122 may be configured to compare the determined intensity values for each analyzed pixel within the received images to a predetermined intensity threshold. In the event that the determined intensity for a given pixel falls below the predetermined intensity threshold, the controller 122 may be configured to identify the given pixel as being obscured or inoperative.

In several embodiments, the controller 122 may be configured to determine when the entire vision-based sensor(s) 104 is effectively obscured or inoperative. Specifically, when a number of pixels of the associated image sensor 108 of a vision-based sensor 104 are determined to be obscured or inoperative, the images captured by such vision-based sensor 104 may be of low quality. In such instances, the vision-based sensor 104 as a whole may be considered obscured or inoperative. For example, in one embodiment, the controller 122 may be configured to compare the number of individual pixels that have been identified as being obscured or inoperative to a predetermined threshold amount. In the event that the total number of obscured or inoperative pixels exceeds the predetermined threshold amount, the controller 122 may be configured to identify the associated vision-based sensor 104 as being obscured or inoperative.

In another embodiment, the controller 122 may be configured to determine when the vision-based sensor(s) 104 is effectively obscured or inoperative based on the density of the identified obscured or inoperative pixels. In certain instances, although the total number of obscured or inoperative pixels may be low, such obscured or inoperative pixels may be clustered or grouped together in a manner that obscures a large enough portion of the captured image such that the overall image quality is low. In such embodiment, the controller 122 may be configured to aggregate or group the individual pixels that have been identified as being obscured or inoperative into one or more pixel groups. For example, such pixel groups may be groups of obscured or inoperative pixels clustered together or regions of the captured images. Thereafter, the controller 122 may be configured to determine the density of the pixels (i.e., the number of obscured or inoperative pixels per unit of area) within each pixel group and compare the determined density to a predetermined threshold density value. In the event that the determined density of one or more of the pixel groups exceeds the predetermined threshold density value, the controller 122 may be configured to identify the associated vision-based sensor 104 as being effectively obscured or inoperative.

Figure 5:
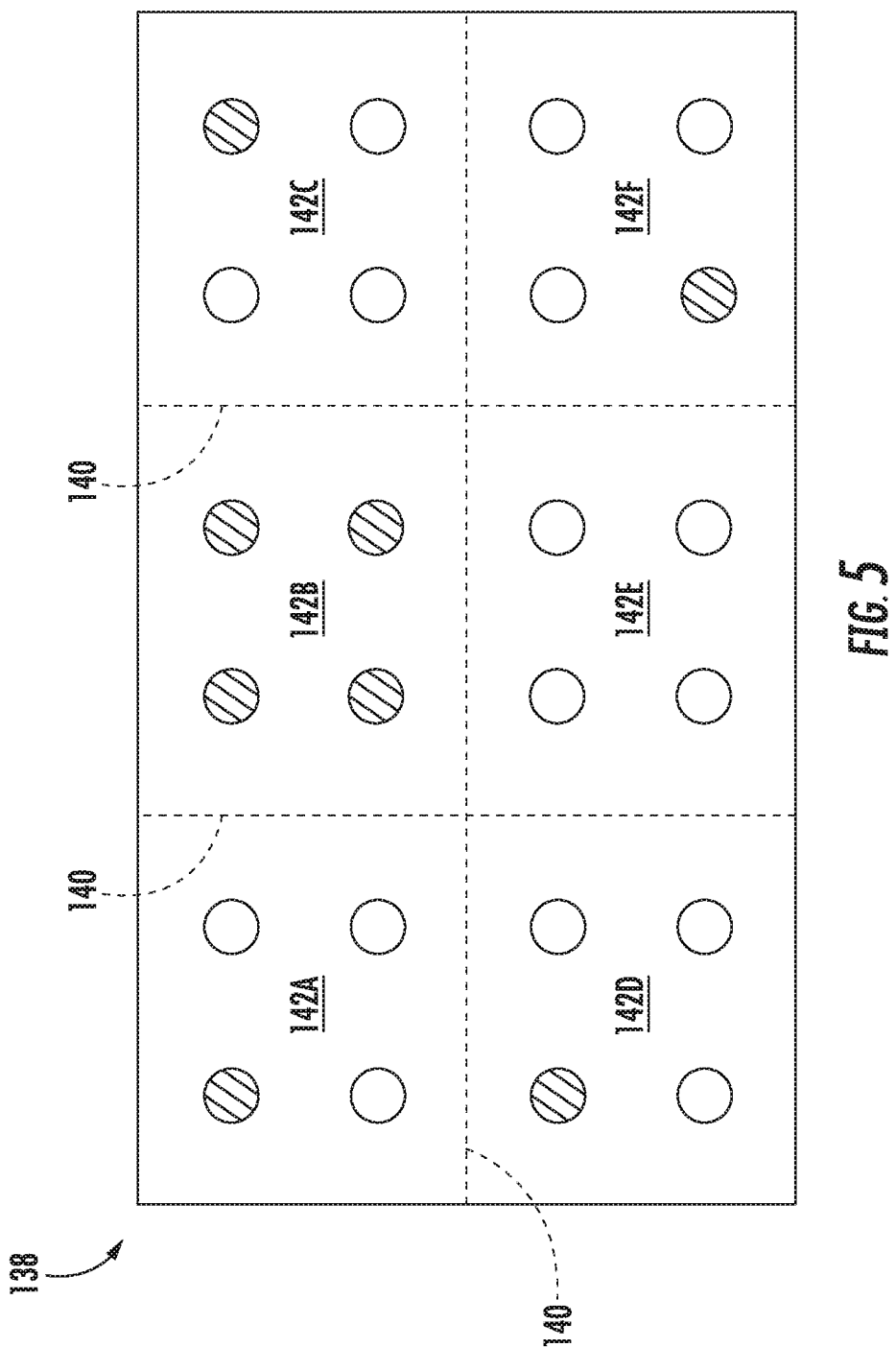
FIG. 5 illustrates an example image captured by a vision-based sensor in accordance with aspects of the present subject matter, particularly illustrating a plurality of pixels contained within the image being aggregated into pixel groups.

Referring now to FIG. 5, an example image 138 captured by one of the vision-based sensors 104 is illustrated in accordance with aspects of the present subject matter. As shown, the image 138 includes a plurality of pixels, with each pixel being schematically represented by a circle. It should be appreciated that the cross-hatched circles represent obscured or inoperative pixels and the empty circles represent unobscured or operative pixels. As indicated above, the controller 122 may be configured to aggregate the obscured or inoperative pixels into one or more pixel groups. In the illustrated embodiment, the controller 122 may be configured to divide the image 138 into six pixel groups 142A-F (e.g., with each pixel group 142A-F being separated h the dashed lines 140 in FIG. 5). It should further be appreciated that, in the illustrated embodiment, for the purposes of description that the density of the obscured or inoperative pixels within the pixel group 142B exceeds above the predetermined threshold density value, while the density of the obscured or inoperative pixels within the pixel groups 142A, 142C-F fall below the predetermined threshold density value. In such instance, the controller 122 may identify the vision-based sensor 104 that captured the image 138 as obscured or inoperative since the density of the obscured or inoperative pixels within at least one of the pixel groups (e.g., the pixel group 142B) exceeds the predetermined threshold density value.

Referring back to FIG. 3, in several embodiments, the controller 122 may be configured to automatically initiate a suitable control action when one or more of the vision-based sensors 104 are identified as being obscured or inoperative. For example, in one embodiment, the controller 122 may be configured generate an operator notification (e.g., by causing a visual or audible notification or indicator to be presented to the operator of the work vehicle 12 via the user interface 102) that provides an indication that one or more of the vision-based sensors 104 have been identified as being obscured or inoperative. In such instances, the operator may then choose to initiate any suitable corrective action he/she believes is necessary, such as by reducing the ground speed of or halting the operation of the implement 14 and/or the work vehicle 12. Further, the operator may initiate the cleaning procedure as described above. Additionally, as explained above, the controller 122 may be configured to automatically initiate the cleaning procedure for the vision-based sensor(s) 104 that has been identified as obscured or inoperative.

Moreover, in one embodiment, the controller 122 may be configured to automatically adjust the speed at which the work vehicle 12 is towing the implement 14 across the field when one or more of the vision-based sensors 104 are identified as being obscured or inoperative. Specifically, the controller 122 may be communicatively coupled to the engine 23 and/or the transmission 25 of the work vehicle 12 via a wired or wireless connection to allow control signals (e.g., as indicated by dashed lines 146, 148 in FIG. 3) to be transmitted from the controller 122 to the engine 23 and/or the transmission 25. The signals 146 may be configured to instruct the engine 25 to vary its power output to increase or decrease the speed of the work vehicle 12. For example, when one or more of the vision-based sensors 104 have been identified as being obscured or inoperative, the control signals 146 may instruct the engine 25 to decrease its power output (e.g., by decreasing the fuel flow to the engine 25) such that the speed at which the work vehicle 12 is moved across the field is decreased. Furthermore, the control signals 148 may be configured to instruct the transmission 25 to upshift or downshift to change the speed of the work vehicle 12. For example, when one or more of the vision-based sensors 104 have been identified as being obscured or inoperative, the control signals 148 may instruct the transmission 25 to downshift such that the speed at which the work vehicle 12 is moved across the field is decreased. However, it should be appreciated that, in alternative embodiments, the controller 122 may be configured to transmit control signals to any other suitable component of the work vehicle 12 and/or implement 14 such that the speed of the work vehicle 12 and/or implement 14 is adjusted. In another embodiment, when an implemented cleaning procedure is unsuccessful, the controller 122 may be configured to automatically halt operation of the work vehicle 12 and/or implement 14.

Figure 6:
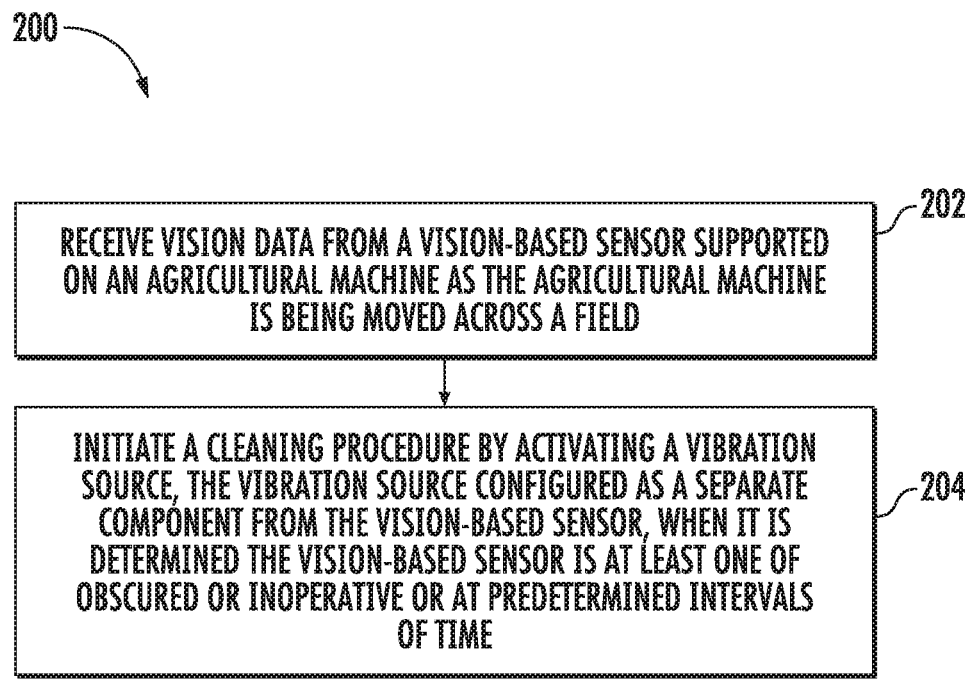
FIG. 6 illustrates a flow diagram of one embodiment of a method for removing debris from a vision-based sensor of an agricultural machine in accordance with aspects of the present subject matter.

Referring now to FIG. 6, a flow diagram of one embodiment of a method 200 for removing debris from a vision-based sensor of an agricultural machine is illustrated in accordance with aspects of the present subject matter. In general, the method 200 will be described herein with reference to the agricultural machine 10 and the system 100 described above with reference to FIGS. 1-3. However, it should be appreciated by those of ordinary skill in the art that the disclosed method 200 may generally be utilized to remove debris from any vision-based sensor of any agricultural machine having any suitable machine configuration and/or in connection with any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include receiving vision data from a vision-based sensor supported on an agricultural machine as the agricultural machine is being moved across the field. For example, as described above, the controller 122 may be communicatively coupled to one or more vision-based sensors 104, which are configured to capture image date 128 as the agricultural machine 10 is moved across the field. As such, the images captured by the vision-based sensor(s) 104 may be received by the controller 126.

Additionally, the method 200 may include determining the vision-based sensor may be at least one of obscured or inoperative. For example, as described above, the controller 122 may be configured to display the images on a user interface 102. As such, the operator may determine the vision-based sensor(s) 104 are obscured or otherwise inoperative based on the displayed images. For instance, as described above, the controller 122 may be configured to determine the vision-based sensor(s) 104 are obscured or otherwise inoperative based on the vision data. For instance, the controller 122 may be configured to determine the image parameter value associated with each of the plurality of pixels contained within each of the images received from the vision-based sensor 104. Additionally, for each respective pixel of the plurality of pixels, the controller 122 may be configured to determine the variance associated with the image parameter values for the respective pixel across the plurality of images. For instance, as described above, the controller 122 may be configured to calculate the variance (e.g., a differential, standard deviation, range, etc.) in the determined image parameter values for each analyzed pixel across the received images. Furthermore, when the variance associated with the image parameter values for a given pixel of the plurality of pixels is outside of a predetermined range, the controller 122 may identify the given pixel as being at least one of obscured or inoperative. For instance, as described above, the controller 122 may be configured to identify a given pixel contained within the received images as being obscured or inoperative when the determined variance of the image parameter values for the given pixel falls below a predetermined variance range.

The controller 122 may also be configured to identify when the vision-based sensor(s) 104 is effectively obscured or inoperative based on a number or a density of individual pixels of the plurality of pixels that have been identified as being obscured or inoperative. For instance, as described above, in one embodiment, the controller 122 may be configured to identify one or more of the vision-based sensors 104 as being effectively obscured or inoperative when the number of individual pixels identified as obscured or inoperative exceeds a threshold amount. In another embodiment, the controller 122 may be configured to identify one or more of the vision-based sensors 104 as being effectively obscured or inoperative when the density of pixels identified as being obscured or inoperative within one or more pixel groups exceeds a predetermined density threshold value.

Further, at (204), the method may include initiating a cleaning procedure by activating a vibration source, the vibration source configured as separate component from the vision-based sensor, when it is determined the vision-based sensor may be to be at least one of obscured or inoperative or at predetermined intervals of time. For instance, as described above, it may be inferred the vision-based sensor(s) 104 is likely obscured or otherwise inoperative when a predetermined interval of time has passed. Additionally, such predetermined interval of time may be determined based on historical data or determined by the controller 122 based on the configuration and/or status of the agricultural machine 10.

Moreover, as described above, the oscillator 118 and/or ultrasonic transmitter 120 may be configured to oscillate the vision-based sensor 104 to remove debris 44 from the vision-based sensor 104. More particular, the controller 122 may power the oscillator 118 and/or ultrasonic transmitter 120 to oscillate the vision-based sensor 104. As one example, the oscillator 118 may be mounted or otherwise coupled to the agricultural machine 10 at the first position 46 and the vision-based sensor 104 may be mounted or otherwise coupled to the oscillator 118 such that the vibrations of the oscillator 118 knock loose debris 44 from the lens(es) 106 of the vision-based sensor 104. As another example, the vision-based sensor 104 may be mounted or otherwise coupled to the agricultural machine 10 at the first position 46. Further, the ultrasonic transmitter 120 may be mounted or otherwise coupled to the agricultural machine 10 at a different position (e.g., second position 48 or third position 52) and transmit ultrasonic waves 50 toward the vision-based sensor 104 to knock loose debris 44 from the lens(es) 106 of the vision-based sensor 104.

It is to be understood that the steps of the method 200 are performed by the controller 122 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 122 described herein, such as the method 200, is implemented in software code or instructions which are tangibly stored on a tangible computer readable medium. The controller 122 loads the software code or instructions via a direct interface with the computer readable medium or via a wired and/or wireless network. Upon loading and executing such software code or instructions by the controller 122, the controller 122 may perform any of the functionality of the controller 122 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for removing debris from a vision-based sensor of an agricultural machine, the system comprising:
   an agricultural machine;
   a vision-based sensor supported on the agricultural machine, the vision-based sensor being configured to generate vision data; and
   a vibration source, the vibration source configured as a separate component from the vision-based sensor, supported on the agricultural machine, the vibration source configured to oscillate the vision-based sensor to remove debris from the vision-based sensor.

2. The system of claim 1, wherein the vibration source is mounted on the agricultural machine, and wherein the vision-based sensor is mounted to the vibration source.

3. The system of claim 1, wherein the vibration source comprises at least one of an offset motor or an acoustic vibration source.

4. The system of claim 1, wherein the vision-based sensor is mounted to the agricultural machine at a first position, and the vibration source is mounted to the agricultural machine at a second position spaced apart from the first position.

5. The system of claim 1, wherein the vibration source comprises an ultrasonic transmitter, the ultrasonic transmitter oriented to transmit ultrasonic waves towards the vision-based sensor.

6. The system of claim 1, wherein the vibration source is configured to oscillate the vision-based sensor at a frequency between 150 kilohertz and 25 megahertz.

7. The system of claim 1, wherein the vision-based sensor comprises at least one of an optical sensor, camera, or LIDAR sensor.

8. The system of claim 1, wherein the vision data comprises a plurality of images and wherein the system further comprises a controller communicatively coupled to the vision-based sensor, the controller being configured to receive the plurality of images from the vision-based sensor.

9. The system of claim 8, wherein the controller is further configured to monitor the plurality of images received from the vision-based sensor and determine at least one parameter indicative of a condition of a field.

10. The system of claim 8, wherein the controller is communicatively coupled to the vibration source, and wherein the controller is further configured to activate the vibration source at predetermined intervals of time for a predetermined length of time.

11. The system of claim 8, wherein the controller is communicatively coupled to the vibration source, the controller further configured to monitor the plurality of images received from the vision-based sensor and identity the vision-based sensor as being at least one of obscured or inoperative based on the monitored plurality of images, and wherein the controller is further configured to activate the vibration source when the controller identifies the vision-based sensor as being at least one of obscured or inoperative.

12. The system of claim 11, wherein the controller is configured to identify the vision-based sensor as being at least one of obscured or inoperative based on the monitored plurality of images by:
   determining an image parameter value associated with each of a plurality of pixels contained within each of the plurality of images;
   for each respective pixel of the plurality of pixels, determining a variance associated with the image parameter values for the respective pixel across the plurality of images;
   when the variance associated with the image parameter values for a given pixel of the plurality of pixels falls outside of a predetermined range, identifying the given pixel as being at least one of obscured or inoperative; and
   identifying the vision-based sensor as being obscured or inoperative when at least one of a given number of individual pixels of the plurality of pixels that have been identified as being obscured or inoperative exceeds a predetermined threshold amount or when a density of the individual pixels of the plurality of pixels that have been identified as being obscured or inoperative exceeds a predetermined threshold density value.

13. A method for removing debris from a vision-based sensor of an agricultural machine, the method comprising:
   receiving, with a computing device, vision data from a vision-based sensor supported on an agricultural machine as the agricultural machine is being moved across a field; and
   initiating, with the computing device, a cleaning procedure by activating a vibration source, the vibration source configured as a separate component from the vision-based sensor, when it is determined the vision-based sensor is at least one of obscured or inoperative or at predetermined intervals of time, wherein the vibration source is configured to oscillate the vision-based sensor to remove debris from the vision-based sensor.

14. The method of claim 13, wherein the vibration source is mounted on the agricultural machine, and wherein the vision-based sensor is mounted to the vibration source.

15. The method of claim 13, wherein the vision-based sensor is mounted to the agricultural machine at a first position, and the vibration source is mounted to the agricultural machine at a second position spaced apart from the first position.

16. The method of claim 13, wherein the vibration source comprises at least one of an offset motor, an acoustic vibration source, or an ultrasonic transmitter, and wherein the vision-based sensor comprises at least one of an optical sensor, a camera, or a LIDAR sensor.

17. The method of claim 13, wherein the vision data comprises a plurality of images, the method further comprising:
   monitoring, with the computing device, the plurality of images received from the vision-based sensor; and
   determining, with the computing device, at least one parameter indicative of a condition of the field based on the monitored plurality of images.

18. The method of claim 13, wherein the vibration source is activated for a predetermined length of time.

19. The method of claim 13, wherein the vision data comprises a plurality of images and wherein determining whether the vision-based sensor is at least one of obscured or inoperative comprises monitoring, with the computing device, the plurality of images received from the vision-based sensor and identifying the vision-based sensor as being at least one of obscured or inoperative based on the monitored plurality of images.

20. The method of claim 19, wherein identifying the vision-based sensor as being at least one of obscured or inoperative based on the monitored plurality of images comprises:

determining an image parameter value associated with each of a plurality of pixels contained within each of the plurality of images;

for each respective pixel of the plurality of pixels, determining a variance associated with the image parameter values for the respective pixel across the plurality of images;

when the variance associated with the image parameter values for a given pixel of the plurality of pixels falls outside of a predetermined range, identifying the given pixel as being at least one of obscured or inoperative; and identify the vision-based sensor as being obscured or inoperative when at least one of a given number of individual pixels of the plurality of pixels that have been identified as being obscured or inoperative exceeds a predetermined threshold amount or when a density of the individual pixels of the plurality of pixels that have been identified as being obscured or inoperative exceeds a predetermined threshold density value.

* * * * *